United States Patent [19]
Fukugami et al.

[11] 3,801,089
[45] Apr. 2, 1974

[54] AUTOMATIC VERTICAL BAND SAWING MACHINE PROVIDED WITH MECHANISM TO ATTENUATE THE RESONANCE BETWEEN THE SAWING BLADE AND THE WORK TABLE

[76] Inventors: Goro Fukugami, 2104-24, Sohbudai-danchi, Sagamihara-shi, Kanagawa-ken; Chiaki Tamura, 423, Naka-machi, Ono-shi, Hyogo-ken; Hideji Majima, 3385, Zama, Zami-shi, Kanagawa-ken; Hideo Takahashi, 5-29-11, Nagaski, Toshima-ku, Tokyo, all of Japan

[22] Filed: Mar. 17, 1972

[21] Appl. No.: 235,631

[30] Foreign Application Priority Data
Mar. 19, 1971 Japan.............................. 46-15177
Aug. 31, 1971 Japan.............................. 46-66310

[52] U.S. Cl..................... 83/74, 83/411 R, 83/698, 83/794, 83/797, 83/810, 83/820, 269/57
[51] Int. Cl............................................. B26d 5/20
[58] Field of Search ............. 83/810, 809, 811, 812, 83/72, 411 R, 581, 648, 74, 820, 789, 698, 794, 797; 33/174 TA; 269/55, 56, 58

[56] References Cited
UNITED STATES PATENTS
| | | | |
|---|---|---|---|
| 3,733,952 | 5/1973 | Fukugami et al..................... | 83/789 |
| 3,540,334 | 11/1970 | McLaughlan..................... | 83/820 X |
| 3,187,788 | 6/1965 | Ferrari.............................. | 83/581 X |
| 3,111,054 | 11/1963 | Tishken............................ | 83/581 X |
| 2,973,956 | 3/1961 | Hartley........................... | 269/57 UX |
| 2,774,131 | 12/1956 | Crane.................................... | 83/820 |
| 798,519 | 8/1905 | Manning............................... | 83/811 |

Primary Examiner—Andrew R. Juhasz
Assistant Examiner—W. D. Bray
Attorney, Agent, or Firm—Chittick, Thompson & Pfund

[57] ABSTRACT

This invention relates to the improved technology of a vertical band sawing machine and in particular to vertical band sawing machine capable of inclining and/or setting the work table in relation with the sawing blade universally (i.e. both longitudinally and/or transversely) which comprises providing said machine with the work table including mechanism for free backward travelling by means of a suitable tracking mechanism, mechanism for free transverse traveling and mechanism for free turning in a suitable manner, enabling it to cut the workpiece automatically on the work table along the prescribed model curve by turning the work table by means of said free turning mechanism both clockwise and counterclockwise according to the conrol signal from the mechanism to detect said model curve, and further incorporating mechanism to attenuate the resonance of the work table with the band sawing blade caused by the elastic band sawing blade and the aforesaid free transverse travelling mechanism during the curve-cutting.

5 Claims, 13 Drawing Figures

AUTOMATIC VERTICAL BAND SAWING MACHINE PROVIDED WITH MECHANISM TO ATTENUATE THE RESONANCE BETWEEN THE SAWING BLADE AND THE WORK TABLE

DETAILED DESCRIPTION OF THE INVENTION

The present invention provides a vertical band sawing machine capable of inclining and/or setting the work table in relation with the sawing blade universally (i.e. both longitudinally and/or transversely) which comprises providing said machine with the working table including mechanism for free backward travelling by means of a suitable tracking mechanism, mechanism for free transverse travelling and mechanism for free turning in a suitable manner, providing said machine with mechanism to track the cutting curve by turning the work table by means of aforesaid free turning mechanism both clockwise and counterclockwise by detecting said cutting curve of the workpiece on the work table, and thus enabling more precise tracking of the cutting curve by incorporating mechanism to attenuate the resonance of the working table with the band sawing blade along the transverse direction against the cutting track of said belt sawing blade. The other features and advantages of the invention will be illustrated hereinafter by referring to the attached drawings.

DESCRIPTION OF THE PREFERRED EMBODIMENT

Figure 1:
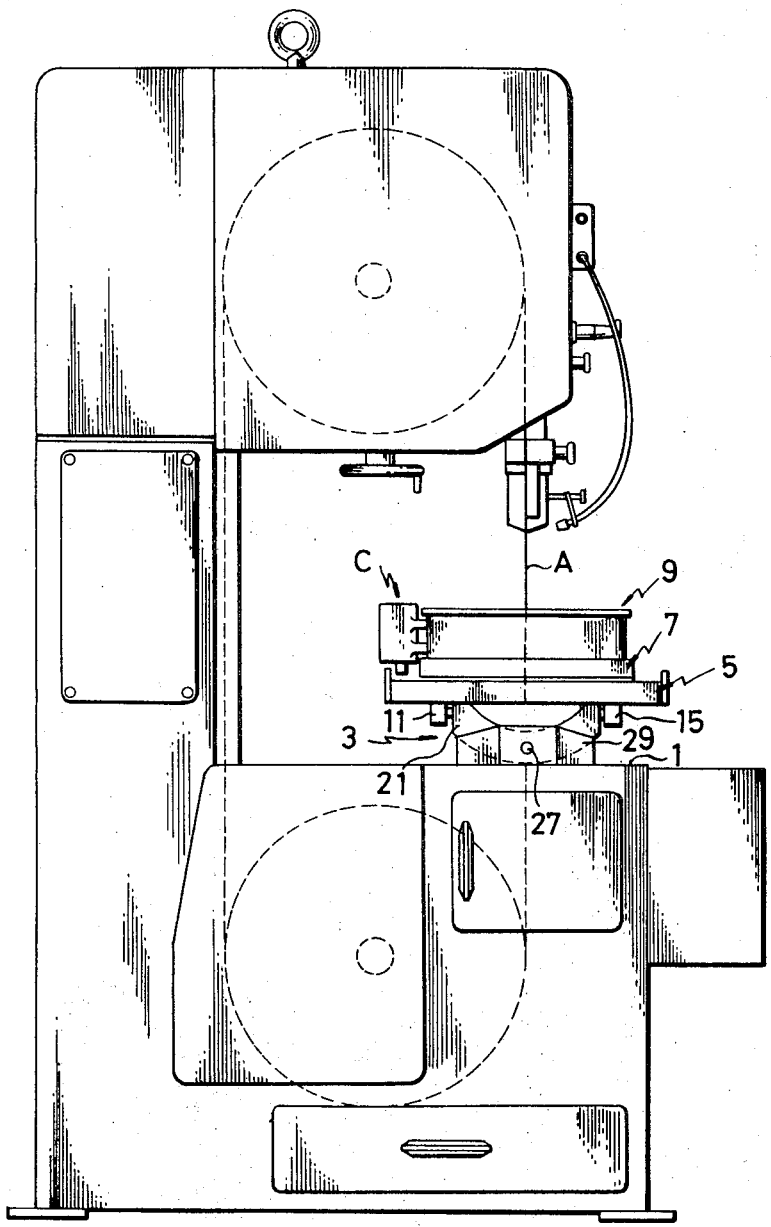
FIG. 1 is the front view of the complete machine representing an embodiment of the present invention.
Figure 2:
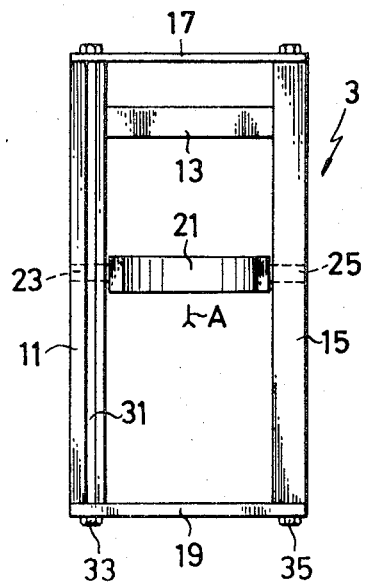
FIG. 2 is the plan view of the frame-stand of the work table of the machine according to the present invention.
Figure 4:
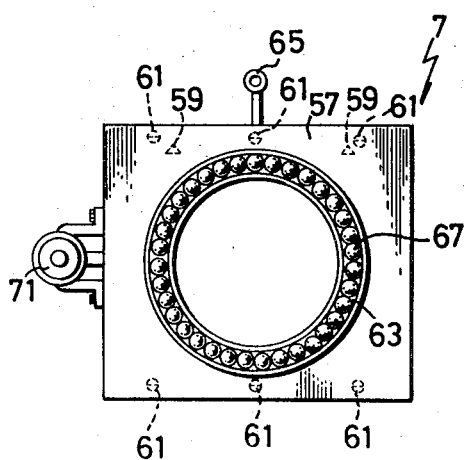
FIG. 4 is the plan view of the transverse traveller of said work table.
Figure 3:
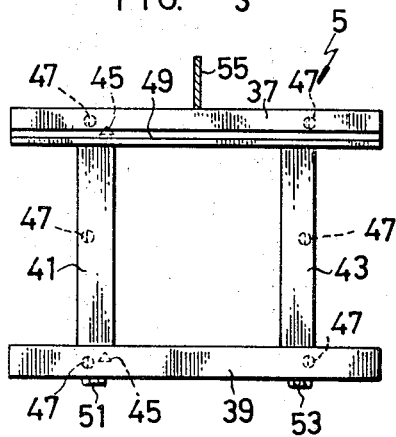
FIG. 3 is the plan view of the longitudinal traveller of said work table.
Figure 5:
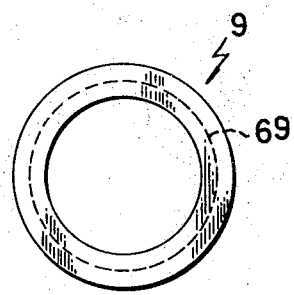
FIG. 5 is the plan view of the turn table of said work table.

The invention will be detailed hereinafter with reference to the attached drawings.

Referring to FIG. 1, FIG. 2, FIG. 3, FIG. 4 and FIG. 5, a universal inclinable mechanism 3 is provided upon the anchored table of the vertical band sawing machine. In this embodiment of the present invention, the inclinable mechanism 3 includes sturdily constructing the frame stand into a grid structure with square steel bars 11, 13, and 15, and rectangular steel bars 17, and 19, providing an circular - based attachment 21 at the middle of said frame stand, making said attachment 21 inclinable across the shafts 23 and 25 longitudinally between said square steel bars 11 and 15, pivoting said attachment 21 to another attachment 29 provided upon the anchored table 1, in a freely rotatable manner by means of pins 27, so as to make said mechanism universally inclinable and freely rotatable. Further a suitable locking element is provided which is not shown in the drawings. Guide grooves 31 are provided upon the upper face of said square bar 11 so as to guide a longitudinal traveller 5. A prewelded and ring-shaped belt saw blade A can be inserted to the prescribed position by opening the grid structure by turning the rectangular steel bar 19 around a bolt 35 as the shaft axis after loosening a bolt 3.

A longitudinal traveller 5 is provided which can move freely along the longitudinal axis of the work table. This longitudinal traveller 5 is constructed into a sturdy grid structure with 4 square steel bars 37, 39, 41 and 43, with guide rollers 45 being provided upon the bottom of said square steel bars 37 and 39 so as to make the longitudinal traveller smoothly slidable along the guide groove 31 of said universal inclinable mechanism 3. On the bottom of said longitudinal traveller 5, 6 stroke bearings 47 are provided to help to slide said traveller 5 very soothly along the longitudinal axis upon the square steel bars 11 and 15. Concave guide grooves 49 are provided upon said square steel bar 37 so as to guide the hereinafter described transverse traveller 7 in a similar manner as the above described guide grooves 31. The square steel bar 39 can be rotated around bolt 53 so as to open the grid after removing the bolt 51 in order to set the belt saw blade A to the prescribed position shown at A in FIG. 3. The wire 55 attached to the square steel bar 37 controls the movement of the traveller 5 along the frame stand 3. Wire 55 is pulled by a heavy weight or a torque motor (not shown), which is provided behind the rectangular steel bar 17 of the universal inclinable mechanism 3.

A transverse traveller 7 can move freely along the transverse axis of the work table which comprises being composed of a plate 57. Two guide rollers 59 are provided upon the bottom of said plate 57 which is guided precisely in the transverse direction along the guide grooves 49 of the square steel bar 37 of said longitudinal traveller 5. However 6 stroke bearings 61 help the transverse traveller 7 to slide very smoothly in the transverse direction on said square steel bars 37 and 39 of said longitudinal traveller 5. A ring-shaped and concave rail 63 is provided upon the top thereof so as to guide a turn table 9. The larger number of steel balls 67 are packed in said rail 63.

Ring-shaped protrusions 69 are provided upon the bottom of said ring shaped turn table 9 which holds the workpiece to be cut. Said protrusions can roll upon the steel balls 67 packed along the rail 63. The driving force is transmitted from D.C. motor driven drive pulley 65 provided upon the transverse traveller 7 across a belt (not shown) so as to control the operation modes; clockwise turning, counterclockwise turning and stopping. The D.C. motor 65 is controlled by the signal transmitted from a suitable means to detect the marking lines marked on the workpiece held on the turn table 9.

The present invention may be embodied with the transverse reclinable mechanism which is described hereinafter.

Figure 6:
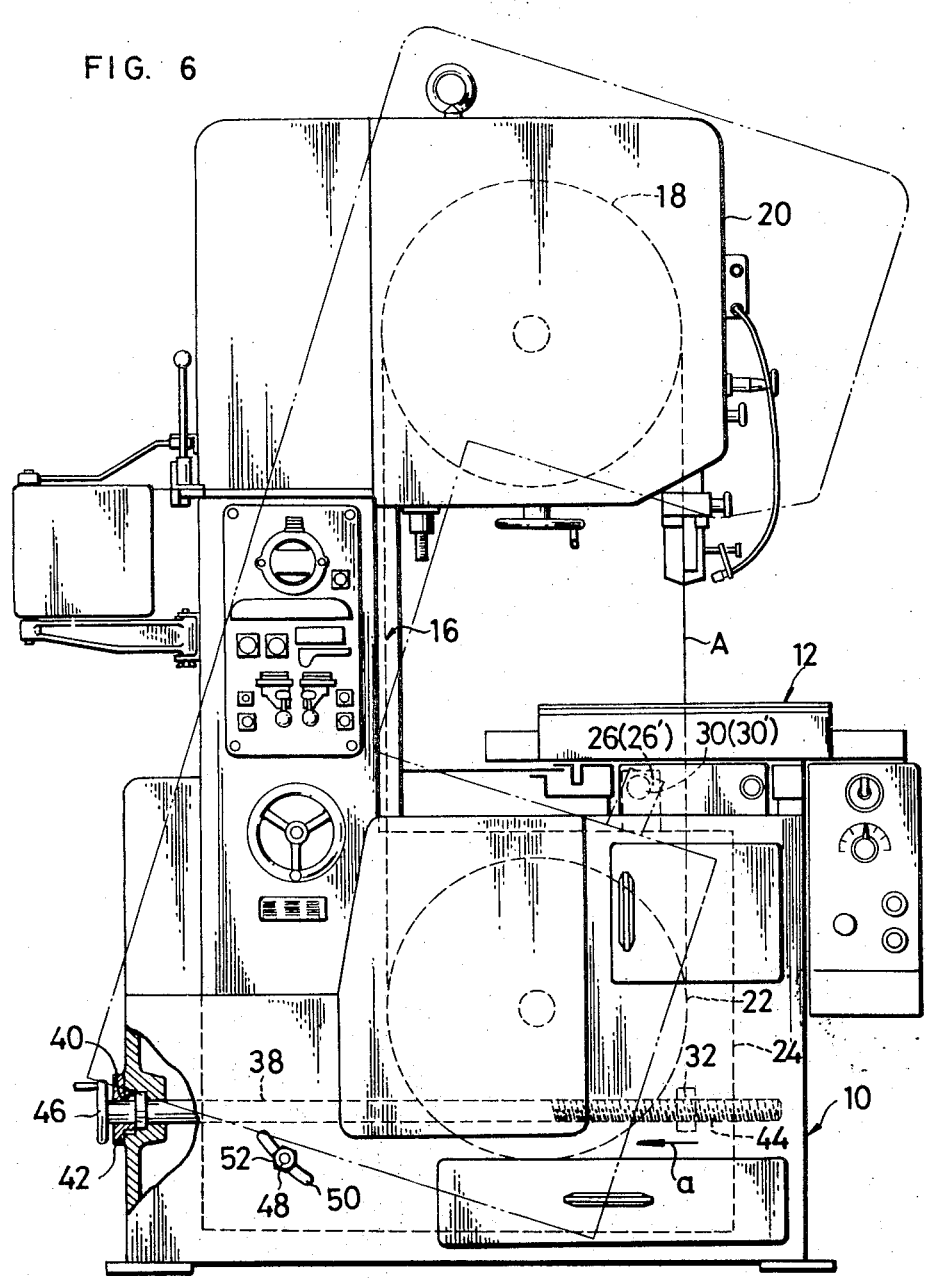
FIG. 6 is the front view of the complete machine representing another embodiment of the present invention, with a part thereof shown in crosssectional view.
Figure 7:
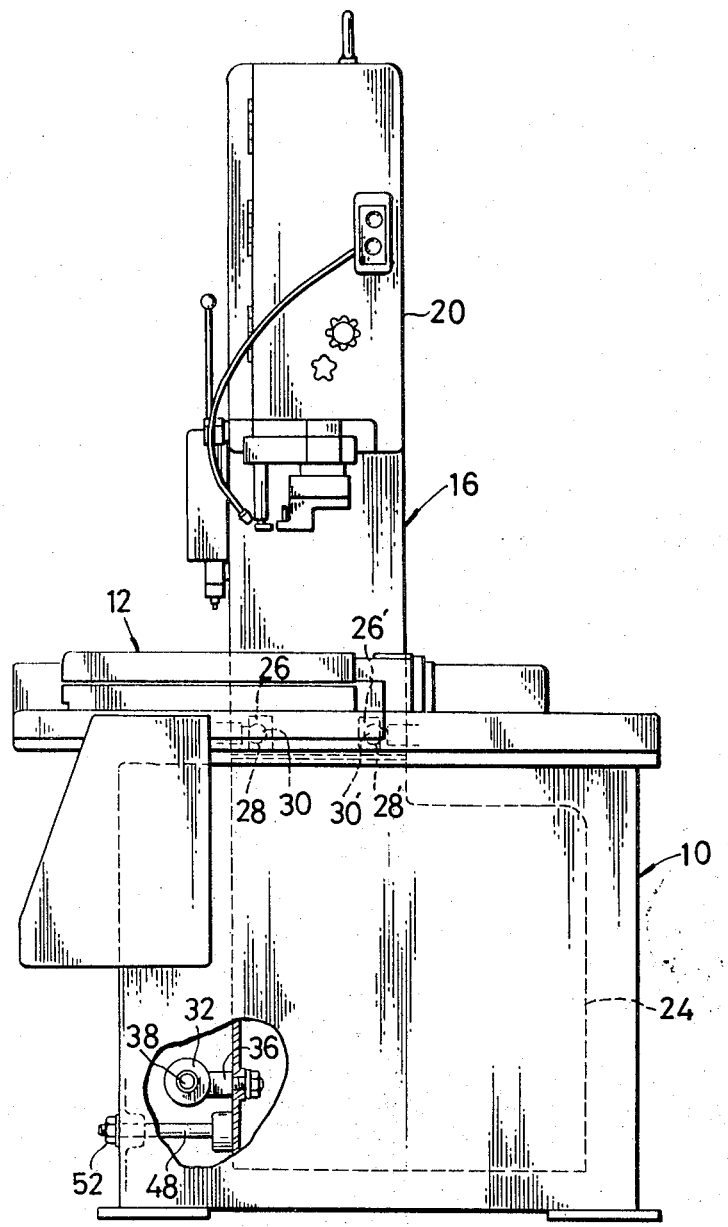
FIG. 7 is the side view of the machine shown in FIG. 6, with a part thereof shown broken away and in crossectional view.

The example of said embodiment is detailed with reference to FIG. 6 and FIG. 7. In FIG. 6 and FIG. 7, an approximately cubic-shaped housing 10 mounts a work table assembly 12 upon the top thereof which can travel freely and turn freely. This work table assembly corresponds to the construction shown in FIG. 2 and FIG. 3. The U shaped structure 16 of the vertical band sawing machine comprises an upper housing 20 which contains a driven wheel 18 and a lower housing 24 which houses a driving wheel 22. The lower housing 24 is contained in the housing 10. The ball sockets 28 and 28' of the supports 26 and 26' which protrude from the top of said lower housing 24 engage in a freely rotatable manner with the ball joints 30 and 30' attached to the housing 10 whereby said main structure 16 of the vertical band sawing machine is suspended in a freely rotatable manner against the housing 10. A nut 32 is integrated with the shaft which is held by the lower housing 24 at the top thereof and also inserted into the aperture provided in the front panel of said lower housing 24 in a freely rotatable manner.

An adjustment shaft 38 is fixed so as not to allow dislodgement along the shaft axis, but can be freely rotatable through the attachment 42 in the aperture 40 which is provided upon the left edge of the housing 10. The threaded portion 44 provided upon the right end thereof engages with said nut 32, while a handle 46 is attached on the left end thereof. A bolt 48 is implanted into the front panel of the lower housing 24 in a protruding manner, whose end engages with a nut 52 after passing through a suitably circular-shaped groove 50 provided in the front panel of the housing 10.

In the above-described embodiment, if a belt saw blade A is desired to be inclined 15° to the right against the workpiece, the nut 52 is loosened to rotate the handle 46, whereby the adjustment shaft 38 pulls the nut 32 in the direction indicated by the arrow (a). Thus the vertical belt saw plate 16 is inclined as shown by the broken line in the drawing with the ball joints 30 and 30' as the shaft axis. The nut 52 is tightened to the bolt 48 to lock the main structure of said vertical belt sawing machine 16 against the housing 10 after the main structure 16 is inclined to the prescribed angle.

Figure 8:
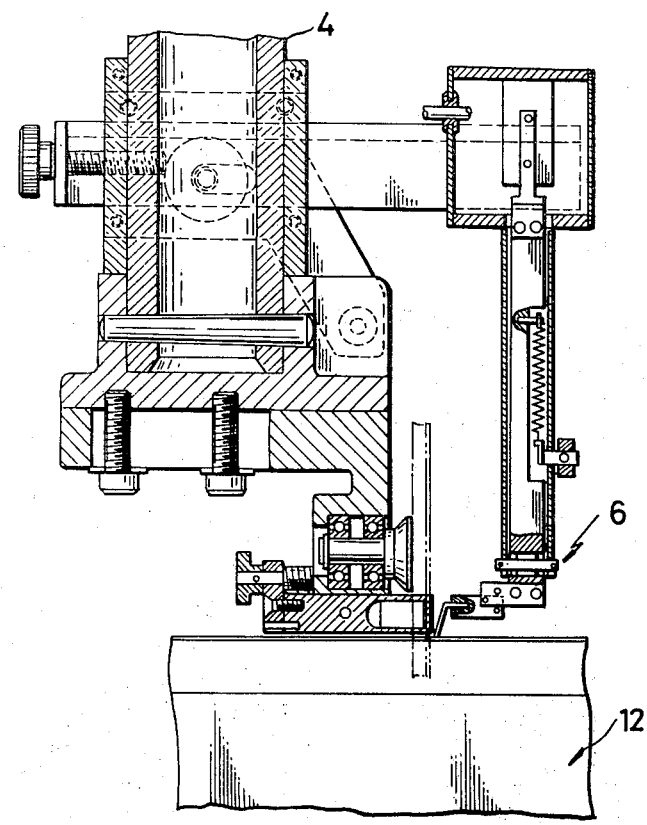
FIG. 8 is the magnified side crosssectional view of an embodiment of the contact-needle type curve detector in the machine according to the present invention.

The means to detect the cutting curve is known in the art. FIG. 8 shows an example wherein a suitable operating mechanism (not shown) is provided on the main structure 16, and a contact needle-type curve detector 6 may be provided so as to detect the guiding of template at the suitable position of a guide post 4, which is suspended from said upper housing 20.

Now the pattern curve can be easily followed and cut into the work piece since the work table can be freely travelling in both the transverse and the longitudinal direction by detecting the curve to be traced such as a template or a marking line on the workpiece by means of the detecting mechanism of the above-described construction, and by holding stationary or rotating the turn table 9 (or the work table assembly 12, abbreviated as the work table hereinafter) clockwise, counterclockwise by means of driving mechanism such as a motor.

In the above-described structure, it is required, however, to solve the problem described below in order to follow the curve more precisely.

Suppose the belt saw blade A is located on the streight line between the upper and the lower blade guiding mechanism, and cutting the workpiece without transverse resistance along the cutting direction; i.e. no force present in any direction transverse to the trace of the belt saw blade A. The blade is travelling in the precisely longitudinal direction.

If at one point on the cutting track, the model curve to be traced is curved, the below described phenomena occurs when the turn table; i.e. the work table turns to trace the curve as controlled by the detecting device. The turning operation of the work table causes transverse bending; i.e. left or right bending against the tracing direction of the belt saw blade A, whereby the cutting is forced to be incorrect due to the characteristics of the elastic bending and the free travelling of the work table. This bending makes the tracing displacement bigger than that required for a correct track when the work table is turning in the opposite direction against the previous tracing direction. As such incorrect tracing runs are repeated, both the blade A and the work table travel to the right and the left repeatedly due to the elastic belt saw blade and the free travelling characteristics of the work table. Thus the work table and the saw blade cooperate to cause resonance which makes for snake shaped cuttings.

This phenomena is similar to the swinging of a pendulum wherein the swinging continues incessantly if an accelerating force is present when the pendulum is returned to the neutral point. Thus the snake-shaped cutting is repeated to form a corrugated cutting face and the precision of the curve cutting is deteriorated.

Figure 9:
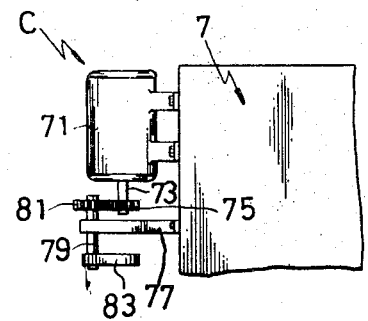
FIG. 9 is the side view of the vibration generator to attenuate the resonance of belt sawing blade with the work table.
Figure 10:
FIG. 10 is the plan view of the vibration generator as shown in FIG. 9.

The present invention relates to the improvement in technology to solve the above described problem. A preferred example of the invention is shown in FIG. 9 and FIG. 10 which lessens the above-described resonance.

A vibration generator C is provided on the transverse traveller 7. As an example of this vibration generator 9 shown in FIG. 9, a vertical motor 71 is attached at the end of the plate 57. A gear 75 fixed upon the output shaft of said motor engages with the gear 81 of the vertical shaft which is supported in a freely rotatable manner across a support clamp 77 by said plate 57. An eccentric block 83 is attached at the lower end of this shaft 79 as shown in FIG. 10. Vibration is generated by revolving the block 83 by driving the vertical motor 71, whereby the microvibration is given to the transverse traveller 7 in the transverse direction against the travelling direction of said transverse traveller; i.e. in the transverse direction of the belt saw blade A. In this case, the transverse traveller 7 and hence the work table are subjected to the incessant microvibration in the transverse direction, and hence the starting from the stopped operation to the travelling operation or the turning to the inverted direction is much easier than with the previous stationary blade. No large reaction force nor large bending will be caused upon the saw blade A because of this. Thus the attenuation of the resonance between the blade A and the work table 9 is much faster than the previous stationary blade.

Figure 11:
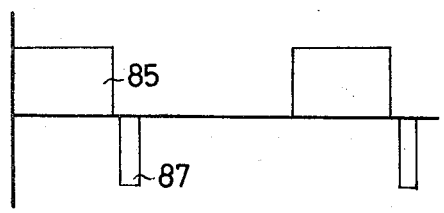
FIG. 11 and FIG. 12 show the waveforms of pulse signals fed to the driving mechanism of the turn table in the work table so as to attenuate the resonance of the belt sawing blade.
Figure 12:
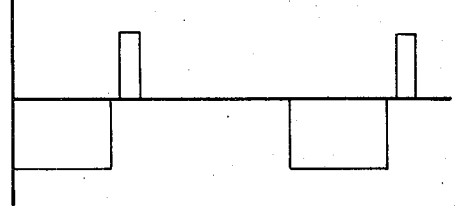

Another preferred embodiment is described with reference FIG. 11, FIG. 12 and FIG. 13. The concept of technology comprises giving a left turning pulse 87 during the time prescribed by said pulse 87 at the end of a suitable span of time after the right turning pulse 85 (vibration pulse or pulsation) starts to turn the work table to the right. FIG. 12 shows the converse version of the concept depicted in FIG. 11 wherein the left turning pulse is first given.

Figure 13:
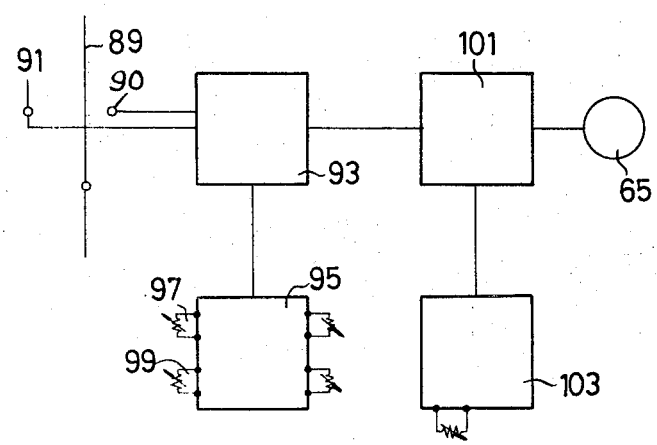
FIG. 13 is the electric wiring diagram which shows the control circuits and power circuits to control the turn table of the work table and also to generate the pulses as shown in FIG. 12.

The embodiment of the aforesaid concept according to the present invention is shown in FIG. 13 wherein the right/left turning inverter 93 is actuated by contacting the left turning instruction contact 91 with the head 89 of the contact needle, regulators 97 and 99 control the duration of left turning and the duration of the inverted right turning pulse following the first left-turning pulse by means of a pulse generator 95, said pulses are fed to an amplifier 101 to drive a D.C. motor 65 and the D.C. motor 65 is driven through the stabilized power supply 103. The converse action occurs for the head 89 contacting the right turning instruction contact 90.

The manner of the operation is similar when the right turning instruction is given.

By means of this machine with the above-described pulse inversion concept, resonance is rapidly attenuated and the precision in tracing is highly improved. The construction of the resonance attenuation mechanism is not be limited to aforementioned examples, but includes all the embodiments which can attenuate the transverse resonance energy against the work table and the belt saw blade.

We claim:

1. A band sawing machine comprising a housing, a band saw unit operatively mounted in said housing, means for driving the band saw, a work table for supporting work to be cut, means for mounting said table whereby the table may be tilted in any direction and whereby the table may be moved longitudinally and/or transversely of said band saw, said mounting means also including means whereby said work table may be rotated about an axis normal to its plane, means for tracking a cutting curve on a workpiece positioned on said table as said band saw cuts through said workpiece along said cutting curve, power means for rotating the work table about its said axis, means actuated by said tracking means for initiating operation of said power means to rotate said work table to a position so that said band saw will be generally directed along said cutting curve, and means attached to the non-rotatable part of said work table to attenuate the resonance of the work table with the band saw in the transverse direction across the cutting track of said band saw blade whereby the path of said band saw along said cutting curve will be more accurately aligned therewith than would be the case in the absence of said attenuating means.

2. The construction set forth in claim 2, said mounting means for said work table comprising a first member pivoted to said housing, a second member pivoted to said first member, a third member slidable in one direction on said second member, a fourth member slidable on said third member in a direction at right angles to the direction of sliding movement of said third member, and a fifth member carried by and rotatable on said fourth member.

3. The construction set forth in claim 2, said means for causing attenuation of said resonance being a rotating drive for vibrating said work table in said transverse direction.

4. Apparatus according to claim 4 and including means for generating pulsating control signals for controlling said vibration, said signals providing a deviation correcting pulse driving force followed by a pulse driving force in the opposite direction.

5. In a band saw having a universally movable work table and means for vibrating said work table transverse to the cutting track of the band saw blade, control means for said vibrating means comprising limit means for sensing deviation of said blade relative to a controlled cut line, means for applying pulsating control signals to said vibrating means opposed to said deviation and means for applying an opposite pulsating control signal a predetermined time after application of said deviation opposed control signal.

* * * * *